July 15, 1969  M. S. DIETZ  3,455,220
COMBINED VIEWFINDER AND PHOTOMETER FOR PHOTOGRAPHIC APPARATUS
Filed July 13, 1966  4 Sheets-Sheet 1

INVENTOR.
Milton S. Dietz
BY
Brown and Mikulka
and
John H. Coult
ATTORNEYS

COMBINED VIEWFINDER AND PHOTOMETER FOR PHOTOGRAPHIC APPARATUS

INVENTOR
Milton S. Dietz
BY Brown and Mikulka
and
John H. Coult
ATTORNEYS

July 15, 1969 M. S. DIETZ 3,455,220

COMBINED VIEWFINDER AND PHOTOMETER FOR PHOTOGRAPHIC APPARATUS

Filed July 13, 1966 4 Sheets-Sheet 3

INVENTOR
Milton S. Dietz

BY

Brown and Mikulka
and
John H. Coult
ATTORNEYS

July 15, 1969 M. S. DIETZ 3,455,220

COMBINED VIEWFINDER AND PHOTOMETER FOR PHOTOGRAPHIC APPARATUS

Filed July 13, 1966 4 Sheets-Sheet 4

INVENTOR.
Milton S. Dietz
BY
Brown and Mikulka
and
John H. Coult
ATTORNEYS

United States Patent Office 3,455,220

Patented July 15, 1969

1

3,455,220

COMBINED VIEWFINDER AND PHOTOMETER FOR PHOTOGRAPHIC APPARATUS

Milton S. Dietz, Lexington, Mass., assignor to Polaroid Corporation, Cambridge, Mass., a corporation of Delaware Filed July 13, 1966, Ser. No. 564,950
Int. Cl. G01j 1/12
U.S. Cl. 95—10 7 Claims

ABSTRACT OF THE DISCLOSURE

A compact viewfinder includes a light transmissible mask, a galvanometric exposure meter having a pointer and an optical system for imposing an image of the mask and the pointer upon a field of view. The galvanometer is located behind a reflective surface which reflects the image of its pointer into the viewfinder.

This invention relates to a combined viewfinder-exposure meter for photographic apparatus, and more particularly to a viewfinder combined with a galvanometric exposure meter in such a way that an image of the meter pointer is imposed upon the field of view presented by the viewfinder.

A number of cameras have been marketed recently which include a galvanometric exposure meter incorporated into the viewfinder assembly in such a way that the meter pointer, or an image thereof, is visible on or adjacent the field of view presented by the viewfinder. Photographic apparatus having an exposure meter incorporated into the viewfinder assembly has many advantages over apparatus requiring a separate exposure meter. Among such advantages are the speed and ease with which the operator can proceed from a photometric operation to the initiation of an exposure based on an exposure factor or factors derived from the photometric operation.

However, a number of problems attend such attempts to combine a galvonometric exposure meter with a viewfinder. One of the primary areas of concern has been that of how to incorporate a meter into the viewfinder without the necessity of greatly increasing the size of the viewfinder. Another problem has involved the need to magnify the image of the meter pointer, which may, for example, have a thickness of .010 inch, sufficiently that it may be seen without difficulty by the operator. This invention contemplates the provision of low-cost apparatus for solving this magnification problem without the need for a separate optical system for magnifying only the image of the pointer.

Accordingly, it is an object of this invention to provide, for use in a photographic camera, a viewfinder incorporating a galvanometric exposure meter in an extremely compact and convenient arrangement within a viewfinder housing.

It is another object of this invention to provide, for use in a photographic camera, a galvanometric exposure meter combined with a viewfinder in such a way that an enlarged, clearly discernable image of the exposure meter pointer is imposed upon the field of view presented by the viewfinder without the need for a supplementary optical system to magnify the image of the pointer.

It is a further object of this invention to provide, for use in a photographic camera, a galvanometric exposure meter combined with a viewfinder in an arrangement which is relatively inexpensive to produce.

Other objects of the invention will in part be obvious and will in part appear hereinafter.

Briefly, one embodiment of the inventive concepts in a

2 photographic camera may comprise a viewfinder for defining a field of view along an optical axis, mask means laterally offset from the optical axis and having a pattern of light-transmissible areas therein, means for imposing an image of the light-transmissible areas on the field of view, and a galvanometer responsive to scene light positioned such that a galvanometer indicating member is disposed adjacent the mask in cooperative relationship with certain areas in the pattern of areas. The indicating member is rendered visible on the field of view by virtue of its interception of light passing through at least one area of said pattern of areas.

The invention accordingly comprises the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawings wherein.

Figure 1:
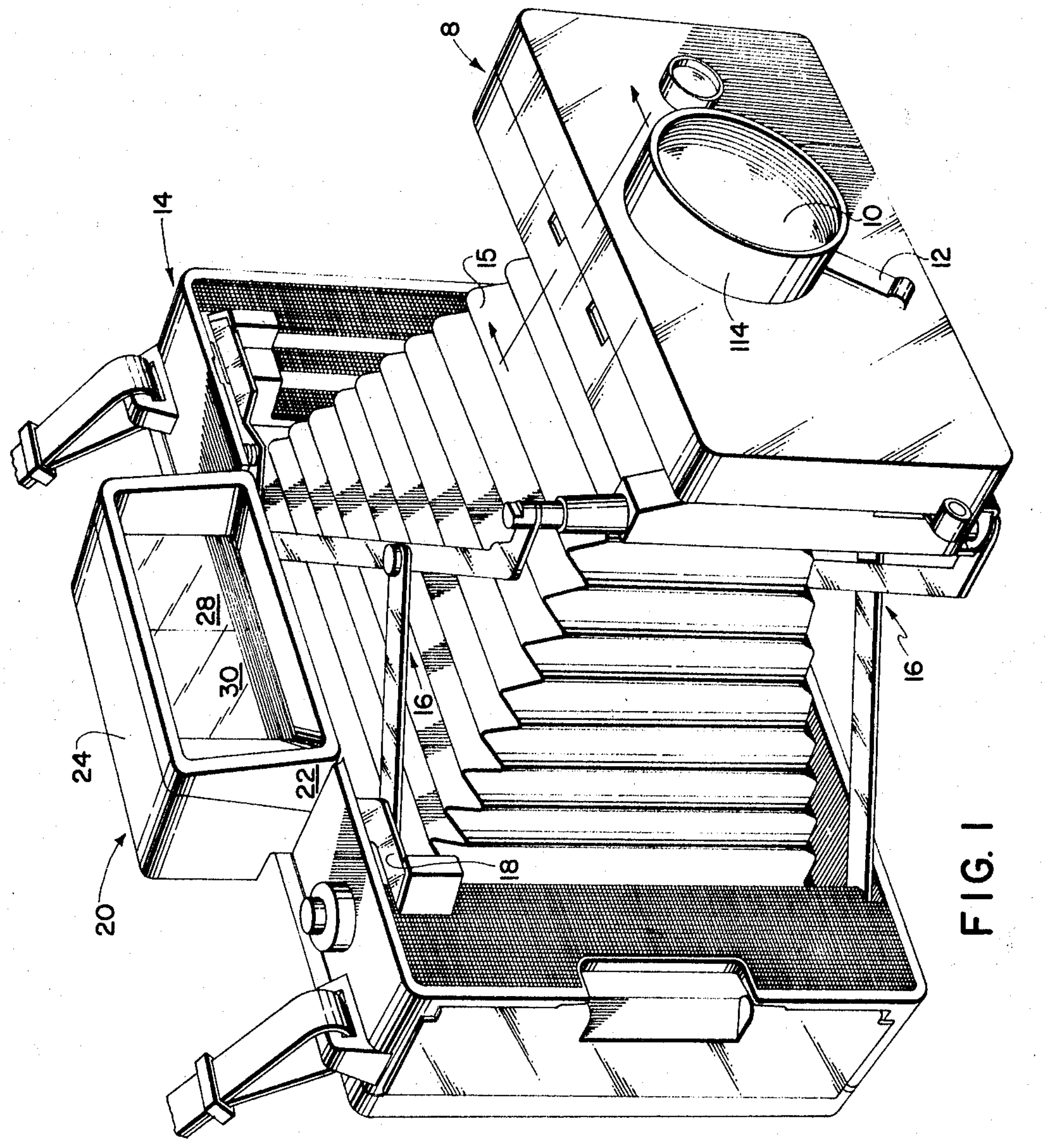
FIGURE 1 is a perspective view of a photographic camera exemplifying one possible structural environment for the present invention.

The drawings illustrate one possible structural implementation of the inventive concept. The exemplary embodiment of the invention is illustrated as being incorporated in a photographic camera having a front assembly 8, including an objective lens 10, and a back assembly 14 interconnected by a bellows 15. An articulated erecting system 16 and a focusing bar 18 are provided for effecting focusing movement of lens 10 by manual movement of bar 18 in a direction transverse to the primary axis A—A for the camera.

The drawings illustrate a galvanometric exposure metering system combined with a viewfinder which includes range finding means. It will be appreciated by one skilled in the art that the exposure metering system of the invention may be combined with a pure viewfinder, and that the combined range finding means is illustrated and described only for the purpose of setting forth a more useful environment for the invention.

Figures 2, 4, 5, 6:
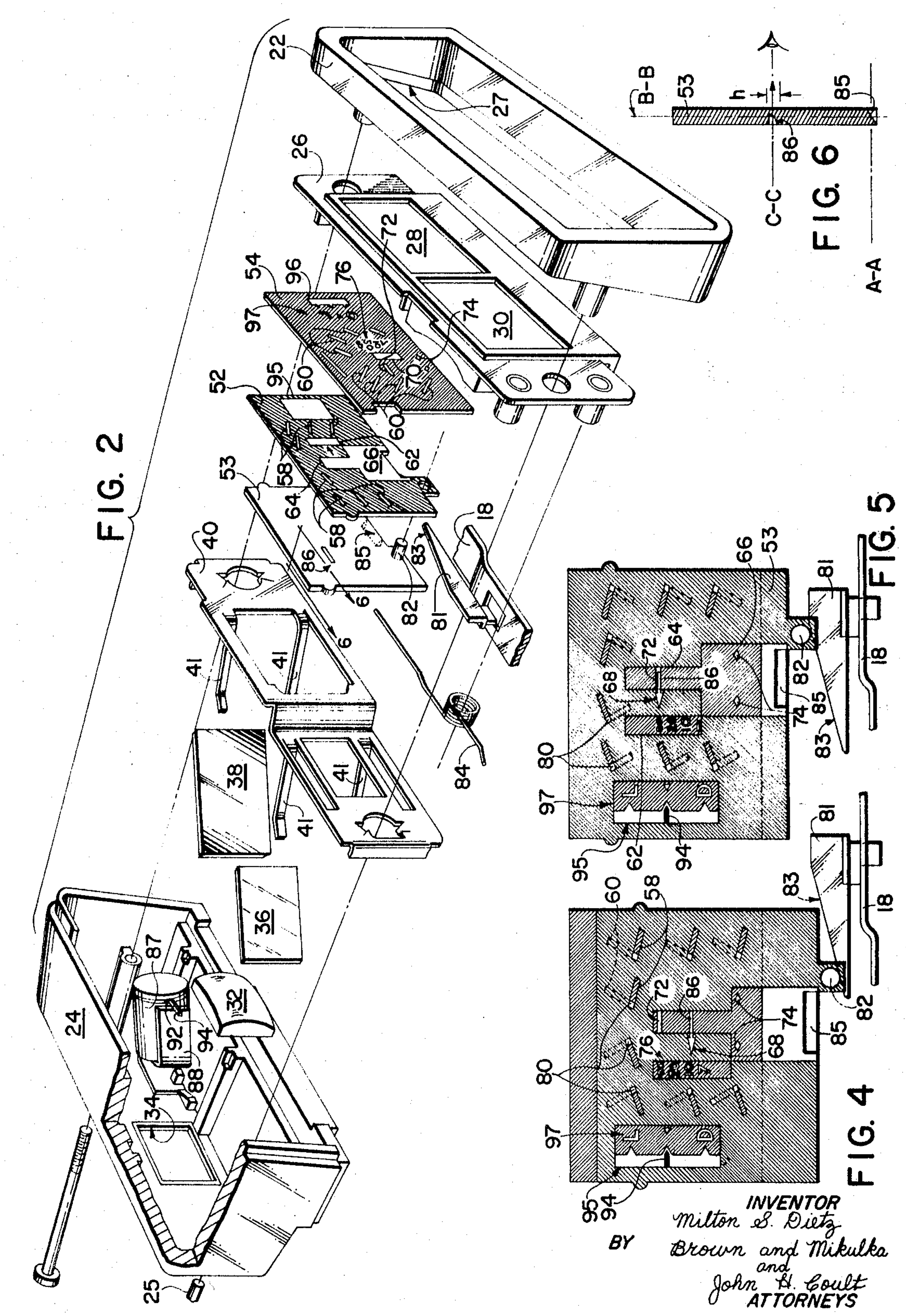
FIG. 2 is an exploded perspective view of a galvanometric exposure meter combined with a viewfinder, the housing for which the viewfinder may be seen in FIGURE 1.
FIGS. 4 and 5 are frontal views in two relative positions of mask means constituting elements of FIG. 2.
FIG. 6 is a section view taken along lines 6—6 in FIG. 5.
Figure 3:
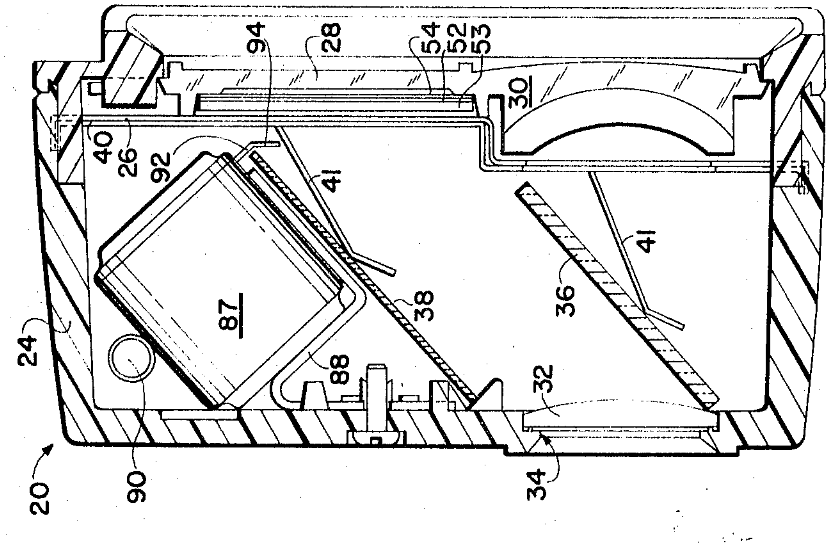
FIG. 3 is a plan view, partly in cross section, showing the arrangement of parts in the viewfinder when assembled.

In order to more clearly understand the construction of the exemplary viewfinder and the range finding apparatus combined therewith, reference may be made especially to FIGS. 2 and 3 of the drawings. A housing 20 may comprise separate front and rear sections, designated 22 and 24, respectively, which may be molded, for example, from a suitable plastic material. Screws 25 are provided for securing the front and rear sections 22 and 24, together after assembly of the elements contained therein. A transparent plate 26 is positioned in a frontal opening 27 provided in front section 22 and includes a planar portion 28 and a negative lens 30. Plate 26 may be formed from glass, plastic, or any other such transparent material having suitable optical properties.

An eyepiece 32 is disposed in an opening 34 in rear section 24 of the housing 20 in optical alignment with the negative lens 30. A partially reflective mirror 36 is arranged along the optical axis of negative lens 30 and eyepiece 32 at an angle of approximately 45° thereto, and a fully reflective mirror 38 is similarly arranged behind planar portion 28 of transparent plate 26 such that mirrors 36 and 38 are substantially parallel to each other. A mounting member 40 is provided with resilient arms 41 for engaging and retaining mirrors 36, 38 in position against appropriate stop means. Eyepiece 32 is preferably a positive lens, forming the rear element of a reversed Galilean viewfinder system, of which negative lens 30 forms the front element. As will be explained in detail below, the mirrors 36, 38 serve to impose an image defined by a mask means upon the field of view defined by the viewfinding system.

To provide a visual indication to the operator of the focus of the camera objective lens 10 and the boundaries of the recordable portion of the scene, masking means may be provided. See FIGS. 4 and 5. The masking means may comprise a movable mask 52 secured to a movable transparent plate 53, and a fixed mask 54 mounted in engagement with planar portion 28 of transparent plate 26.

Opaque portions of masks 52 and 54 are indicated by diagonal shading. The transparent areas of movable mask 52 include a plurality of elongated, rectangular areas, indicated by the reference numeral 58, arranged at a slight angle to the horizontal. Fixed mask 54 includes transparent areas 60, similar in size and shape to the transparent areas 58 on the movable mask 52 sloped in the opposite direction and at a somewhat steeper angle. The transparent areas of movable mask 52 further include rectangles 62 and 64, the latter having one edge contiguous with a larger rectangle 66 and a reference mark 68. The transparent areas on fixed mask 54 further include rectangle 70, a narrow line 72, small diamond-shaped framing areas 74, and indicia 76. The eyepiece 32 is focused in approximately the plane of the masks 52, 54 in order that the framing areas may be sharply perceived by an operator looking into the opening 34 in the viewfinder housing 20.

Mirrors 36, 38 are arranged to reflect light transmitted through masks 52, 54 to the eyepiece 32. Thus, where areas 58 of mask 52 overlap area 60 of mask 54, a rectangular array of diamond-shaped framing marks 80 are formed delimiting the portion of the field of view which will be recorded on the photosensitive film materials. An image of this array of framing marks 80 is imposed on the field of view by the mirrors 36, 38.

For the purpose of coupling focusing movement imparted to the focusing bar 18 to the transparent plate 53, coupling means are provided. The coupling means may include a cam 81 connected with focusing bar 18 and extending through an opening in housing 20 for engagement with a pin 82 on plate 53. Pin 82 is urged into engagement with a camming surface 83 of cam 81 by appropriate biasing means such as a torsion spring 84. Thus, as focusing bar 18 is moved manually to effect focusing movement of the objective lens 10, the motion imparted to cam 81 is transmitted to transparent plate 53 through camming surface 83 and pin 82.

FIGURES 4 and 5 show mask 52 in two different positions relative to mask 54. It is evident that relative movement between masks 52 and 54 will result in different portions of areas 58 and 60 overlapping each other, with a consequent change in the relative position and spacing of framing marks 80. Three sides of the rectangular area framed by the array of framing marks 80 will thus be altered as the objective lens 10 is focused. Thus, this arrangement provides means for visually framing the subject with automatic compensation for parallax errors and changes in field size.

The transparent rectangle 62 formed on movable mask 52 allows the transparent areas of the indicia 76 to be seen by the operator. The transparent rectangle 70 on mask 54 is provided in order that the reference mark 68 on movable mask 52 may be seen throughout the limits of movement of the mask 52. The reference mark 68 and the indicia 76 provide a focused distance scale. This gives the operator a visual indication within the view presented by the viewfinder of the distance from the objective lens 10 to the focused subject or scene.

The range finder with which the viewfinder is combined includes a pair of reference lines visible on the field of view which are moved relative to one another in response to focusing movement of the objective lens 10. A proper focus is achieved with the objective lens 10 by visually matching the lines with a reference dimension on the subject which is to be focused. The fixed reference line constitutes the transparent line 72, rendered visible to the operator through the transparent rectangle 64 in movable maask 52. The reference line which is movable with respect to fixed line 72 is associated with movable plate 53 for movement therewith. In a preferred arrangement prismatic means formed integrally with movable plate 53 is provided for creating a reference line visible to the operator. Referring especially to FIG. 6, a surface 85 is formed in a lower portion of the plate 53 to reflect light upwardly within the plate 53. That is, the portion of the plate 53 to reflect light upwardly within the plate 53 which includes surface 85 acts as a totally reflecting prism to direct light entering along axis A—A to the path indicated by the axis B—B. At the position on axis B—B where the image of the second reference line is to be visible, second prism means are formed by removing an appropriate portion of the forwardly disposed surface of plate 53. This provides a surface 86 which directs a portion of the light from axis B—B to axis C—C, which represents the axis along which the light is reflected by mirrors 36, 38 to the eye of the operator. Thus, plate 53 and the prismatic means formed therein act as a "light pipe" to provide an illuminated image of the movable reference surface 86, having an apparent height indicated in FIG. 6 by the letter *h*, visible to the operator during the viewing and ranging operations.

The surface 86 is so positioned on plate 53, with respect to the position of line 72, that the relationship between the focusing movement of objective lens 10 and the vertical movement of plate 53 enables the operator to focus the lens 10 upon an object of known vertical dimension when the object is aligned between the apparent positions of line 72 and surface 86. Since the illustrated embodiment of the invention is intended for use in a handheld camera, the scene being photographed will often include a person or a group of persons. The distance from the hairline to the chin is substantially equal for most persons over the age of three years, being approximately six to eight inches. Therefore, this distance provides a convenient reference dimension with which the positions of line 72 and surface 86 may be aligned. In the preferred embodiment, the aforementioned relationship between the focusing movement of the lens 10 and the resulting apparent positions of the visible reference line 72 and the surface 86 is chosen so that a dimension of about six to eight inches which is aligned between the line 72 and surface 86 lies at the plane which is focused by the objective lens 10 at the image plane of the camera.

A viewfinder has been described including means for imposing upon the field of view: (1) framing marks for framing the recordable portion of the view, (2) reference lines relatively movable to find the range of a subject in the scence to be photographed, and (3) a focused distance scale cooperable with a movable reference mark for use with flash apparatus. It is often desirable to utilize as a standard piece of equipment for a photographic camera an exposure metering system, for example, a null seeking system incorporating a galvanometer. It has been found to be particularly advantageous to mount and arrange the galvanometer such that the galvanometer pointer, or an image thereof, is visible on or adjacent the field of view presented by the viewfinder. By this invention an arrangement is provided for mounting a galvanometer in an exposure metering system extremely compactly and inexpensively within the housing for the view finder and in such a way that a clearly visible image of the galvanometer pointer is imposed upon the field of view. This is accomplished in accordance with this invention by a unique and advantageous combination of the galvanometer with the structures comprising the viewfinder.

Referring particularly to FIGURES 2 and 3, a generally cylindrical galvanometer 87 is shown mounted behind the fully reflective mirror 38. The galvanometer is mounted compactly within the viewfinder housing by a generally Z-shaped mounting bracket 88 with the longitudinal axis of the galvanometer 87 oriented approximately parallel with the mirror 38. A support post 90 provides support for the galvanometer 87 in a direction transverse to the longitudinal axis thereof.

The galvanometer 87 has an indicating member in the form of a pointer 92 extending from the galvanometer perpendicular to the longitudinal axis thereof for indicating the amount of current being supplied at a given instant to a movable coil or coils (not shown) with the galvanometer 87. An end portion 94 of the pointer 92 is angled from the longitudinal axis of the pointer 92 in order that it may travel generally parallel to the masks 52, 54 and in a space between the masks 52, 54 and the mirror 38. Registered transparent areas 95, 96 in masks 52, 54, respectively, outline the portion 94 of pointer 92 adjacent indicia represented by a trim scale 97 comprising a transparent null mark and transparent letters L and D indicating an exposure value which is too great or not great enough, respectively. Since the pointer interrupts light passing through light-transmissive areas of mask 52, a clearly visible image of the end portion 94 of pointer 92 cooperating with indicia 97 is imposed upon the field of view presented by the viewfinder without the need for a supplementary magnification system for rendering the pointer 92 visible to the operator. This is an important aspect of the invention for the reason that the width of the galvanometer pointer 92 may be in the order of only .010 inch which, without magnification, would be difficult to detect by the operator. By the arrangement described and illustrated above, part of the magnification system of the viewfinder, specifically the positive eyepiece 32, is utilized to provide the magnification necessary to form the image of the galvanometer pointer 92.

Figure 7:
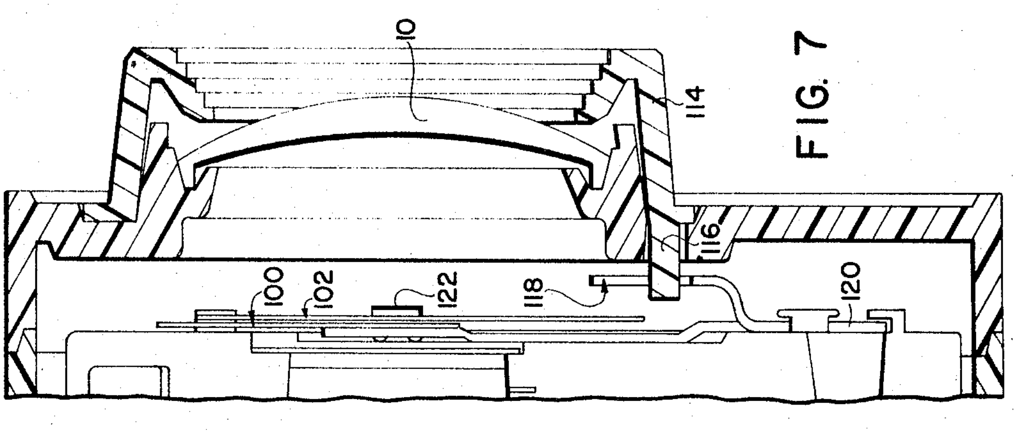
FIG. 7 is a section view taken along lines 7—7 in FIG. 1.
Figure 8:
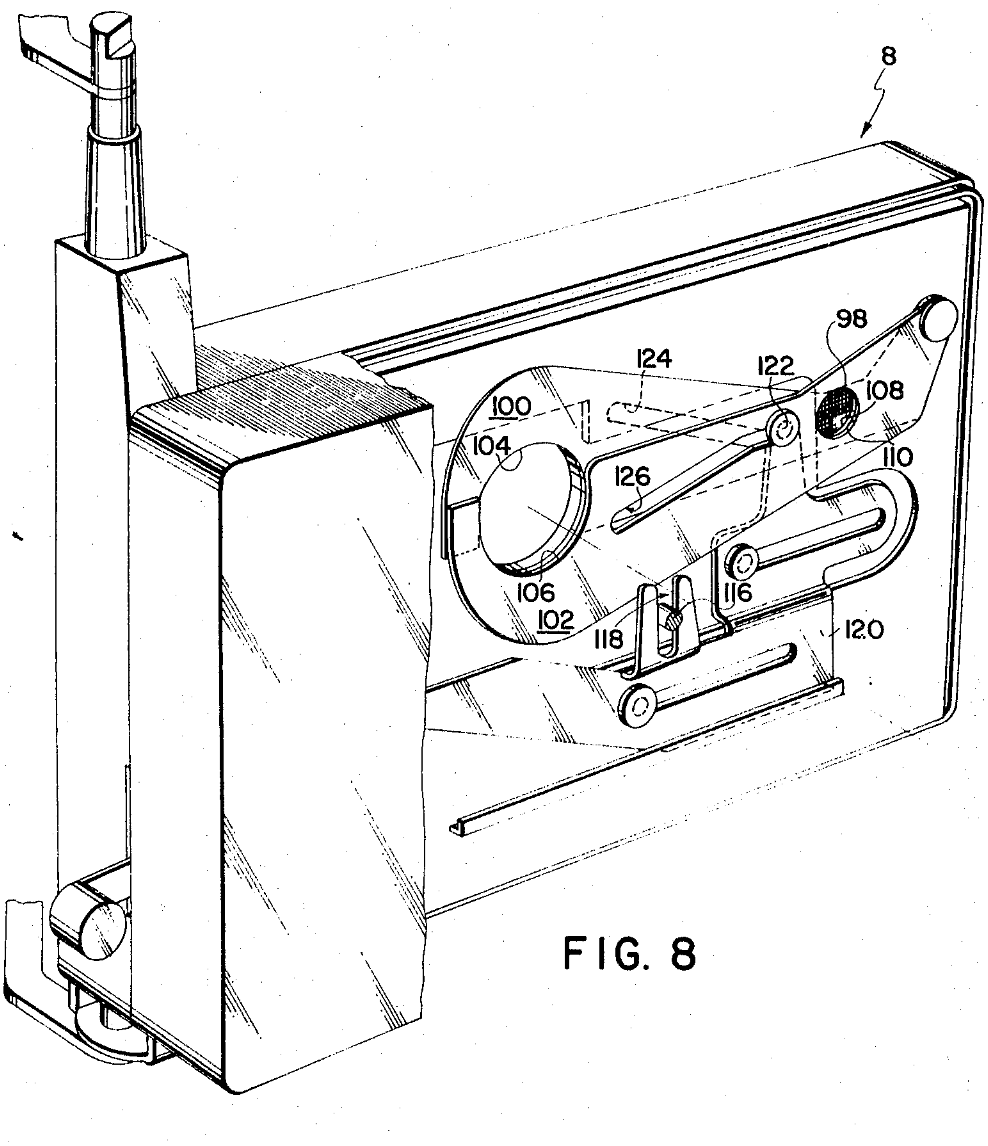
FIG. 8 shows a front assembly on the camera of FIG. 1 partially broken away to reveal certain light control elements concealed therein.

Referring to FIGS. 7 and 8, the galvanometer 87 may be rendered responsive to the level of scene brightness by connecting a photoconductive cell 98 exposed to the scene in series with the galvanometer 87 and a source of electrical power, such as a dry-cell battery (not shown).

To define the effect exposure aperture for the light admitted to photosensitive material through the objective lens 10, a set of diaphragm blades 100, 102 may be provided. The blades 100, 102 have respective recesses 104, 106 therein for defining the effective exposure aperture and openings 108, 110 defining another aperture controlling the amount of light admitted to the photoconductive cell 98.

The angular displacement between the blaces 100, 102 may be adjusted manually by rotating a radial lever 112 (see FIG. 1) extending from a rotatable bezel 114 surrounding the objective lens 10. Rotation of the bezel 114 moves a pin 116 extending inwardly from the bezel 114 through an arcuate locus of travel. The pin 116 may be received in a slot 118 in a slide 120 to translate the arcuate movement of the pin 116 into reciprocatory movement of a control member 122 on slide 120. The control member 122 is received in angularly displaced slots 124, 126 in diaphragm blades 100, 102. It is evident that upon rotation of the bezel 114 by means of lever 112, slide 120 is translated and control member 122 moves in slots 124, 126 to effect a change in the angular displacement between the diaphragm blades 100, 102. Thus, the size of the effective exposure aperture and the amount of light admitted to the photoconductive cell 98 is varied in accordance with the degree of rotation of the lever 112. By a proper selection of the relative dimensions and geometry of the bezel 114, the blades 100, 102 and the slide 120, and a proper calibration of the relevent parameters in the exposure metering system, the blades 100, 102 define an effective exposure aperture which is appropriate for the level of scene brightness when the image of the galvanometer pointer 92 in the field of view indicates a null condition.

It is evident then that by this invention an exposure metering system has been combined with viewfinding apparatus in a manner and with means which accord in all respects with the enumerated objects of the invention.

Since certain changes may be made in the above apparatus without departing from the scope of the invention herein involved, it is intended that all matter contained in the above description or shown in the accompanying drawings be illustrative.

What is claimed is:

1. For use with a photographic camera, the combination comprising:
   viewfinder means including:
      a housing,
      an optical system with an optical axis for defining a field of view which includes a scene to be photographed,
      mask means exposed to scene light and having a pattern of light-transmissible areas, said mask means being disposed substantially perpendicular to said optical axis and displaced therefrom,
      optical means comprising a first optical member having a partially reflective surface disposed obliquely across said optical axis and in the field of view and a second optical member having a fully reflective surface adjacent said mask means and angled with respect thereto, said fully reflective surface being parallel to said partially reflective surface of said first member for reflecting an image of said pattern upon said second partially reflective surface, said partially reflecting surface imposing said image upon said field of view, and
      an exposure meter mounted within said housing adjacent the side of said second optical member opposite said fully reflective surface, said meter being responsive to levels of scene brightness and including a pointer movable adjacent said mask means for indicating relative levels of scene brightness, said optical means imposing on the field of view an image of said pointer in cooperative relationship with a bright image of said pattern, said pointer being rendered visible by virtue of its interception of light passing through at least one of the light-transmissible areas of said mask means.

2. The apparatus defined by claim 1 wherein said meter is mounted on the opposed side of said second optical member from said mask means with the longitudinal axis thereof substantially parallel to said second optical member.

3. The apparatus defined by claim 2 wherein said pattern includes a trim scale cooperable with said pointer image.

4. For use with a photographic camera, the combination comprising:
   a viewfinder having an optical axis along which a field of view is presented;
   mask means having a pattern of light-transmissible areas laterally offset from said optical axis and having selected visible indicia associated therewith;
   means for superimposing on said field of view an image of said light-transmissible areas with said visible indicia, including first and second mirror means, said first mirror means comprising a reflecting surface angularly disposed adjacent said mask means for reflecting light from said mask means laterally toward said optical axis and a surface opposite said reflecting surface, said second mirror means being angularly disposed across said optical axis to reflect light from said first mirror means along said optical axis;

photometer means comprising means exposed to scene light for generating electrical currents in response thereto and a galvanometer connected to receive said currents, said galvanometer being mounted behind said first mirror means adjacent said surface opposite said reflecting surface and having an indicating member extending around an edge of said mirror means adjacent said mask means in cooperative relationship with said visible indicia, said indicating member being rendered visible in said viewfinder by virtue of its interception of light passing through the light-transmissible areas of said mask means.

5. The apparatus as defined by claim 4 includes an eyepiece lens focused on said mask means and said indicating member.

6. The apparatus as defined by claim 5 wherein said second mirror is partially transparent for transmitting scene light along said optical axis.

7. The apparatus as defined by claim 6 wherein said pattern of light-transmissible areas includes framing areas for defining a portion of the field of view recordable on photosensitive materials within the camera.

References Cited

UNITED STATES PATENTS 3,108,526 10/1963 Brackett ---------------- 95—44
3,344,723 10/1967 Rentschler ------------- 95—10

NORTON ANSHER, Primary Examiner

R. A. SCHROEDER, Assistant Examiner

U.S. Cl. X.R.

95—42